United States Patent
Gehring (10) Patent No.: US 9,802,345 B2
(45) Date of Patent: Oct. 31, 2017

(54) INJECTION MOLDING MACHINE FOR MULTIPLE INJECTION OPERATIONS

(71) Applicant: OTTO MANNER INNOVATION GMBH, Bahlingen am (DE)

(72) Inventor: Alexander Gehring, Bötzingen (DE)

(73) Assignee: OTTO MÄNNER INNOVATION GMBH, Bahlingen (DE)

( * ) Notice: Subject to any disclaimer, the term of this patent is extended or adjusted under 35 U.S.C. 154(b) by 384 days.

(21) Appl. No.: 14/454,030

(22) Filed: Aug. 7, 2014

(65) Prior Publication Data

US 2015/0048545 A1     Feb. 19, 2015

(30) Foreign Application Priority Data

Aug. 13, 2013 (DE) .................. 10 2013 216 008
Aug. 13, 2013 (DE) .................. 10 2013 216 013

(51) Int. Cl.
  *B29C 45/16*     (2006.01)
  *B29C 45/13*     (2006.01)
  *B29C 45/04*     (2006.01)
  *B29C 45/17*     (2006.01)

(52) U.S. Cl.
  CPC ........ *B29C 45/162* (2013.01); *B29C 45/0416* (2013.01); *B29C 45/13* (2013.01); *B29C 45/1618* (2013.01); *B29C 45/1671* (2013.01); *B29C 45/17* (2013.01); *B29C 2045/1796* (2013.01)

(58) Field of Classification Search
  CPC . B29C 45/0416; B29C 45/26; B29C 45/0433; B29C 45/1756; B29C 2045/2683; B29C 2045/2685; B29C 45/162; B29C 45/13; B29C 45/1618; B29C 2045/1796; B29C 45/17; B29C 45/1671
  See application file for complete search history.

(56) References Cited

U.S. PATENT DOCUMENTS

| | | | |
|---|---|---|---|
| 3,224,043 A | 12/1965 | Lameris et al. | |
| 3,702,750 A * | 11/1972 | Veneria .............. | B29C 45/1618 264/245 |
| 3,914,081 A * | 10/1975 | Aoki ................... | B29C 45/2681 425/130 |
| 4,144,010 A * | 3/1979 | Fenner ............. | B29C 45/14008 425/125 |
| 4,439,123 A * | 3/1984 | Sano ..................... | B29C 43/203 425/112 |

(Continued)

FOREIGN PATENT DOCUMENTS

| | | |
|---|---|---|
| EP | 0688651 | 12/1995 |
| WO | 2005007381 | 1/2005 |
| WO | 2012130469 | 10/2012 |

*Primary Examiner* — Yogendra Gupta
*Assistant Examiner* — Emmanuel S Luk
(74) *Attorney, Agent, or Firm* — McAndrews, Held & Malloy, Ltd.

(57) ABSTRACT

Injection molding machine comprising at least one first and one second injection unit having a chamber for injecting a plasticized molding material and a piston for advancing a predetermined amount of plasticized molding material along a first axis from the chamber into a cavity of a mold, the machine including a form tool comprised of at least a first tool portion and a second tool portion, a tool cavity being at least partially disposed in the first tool portion.

14 Claims, 10 Drawing Sheets

(56) References Cited

U.S. PATENT DOCUMENTS

| | | | | |
|---|---|---|---|---|
| 4,550,006 A | * | 10/1985 | Laghi | B29C 45/0416 264/297.2 |
| 5,007,822 A | * | 4/1991 | Hara | B29C 45/1615 425/575 |
| 5,075,051 A | * | 12/1991 | Ito | B29C 45/0433 264/297.2 |
| 5,358,398 A | * | 10/1994 | Brown | B29C 35/0277 264/334 |
| 5,422,154 A | * | 6/1995 | Chen | B29C 45/06 156/307.3 |
| 5,501,589 A | * | 3/1996 | Marcus | B29C 45/0416 264/328.16 |
| 5,501,593 A | * | 3/1996 | Marcus | B29C 45/0416 264/328.16 |
| 5,573,791 A | | 11/1996 | Marcus | |
| 5,736,169 A | * | 4/1998 | Brams | B29C 45/062 425/450.1 |
| 5,766,651 A | | 6/1998 | Massano | |
| 5,817,345 A | | 10/1998 | Koch et al. | |
| 6,019,929 A | | 2/2000 | Noggle et al. | |
| 6,095,788 A | | 8/2000 | van Manen et al. | |
| 6,398,537 B2 | | 6/2002 | Matysek | |
| 6,468,458 B1 | * | 10/2002 | Anderson | B29C 45/0013 264/245 |
| 6,613,262 B1 | | 9/2003 | Arend | |
| 6,634,877 B2 | | 10/2003 | Sicilia et al. | |
| 6,790,027 B1 | * | 9/2004 | Callen | B29C 45/062 425/556 |
| 7,144,537 B2 | * | 12/2006 | Tustin | B29C 45/162 264/255 |
| 7,484,948 B2 | | 2/2009 | Wimberger | |
| 7,615,176 B2 | | 11/2009 | Collette et al. | |
| 8,408,890 B2 | * | 4/2013 | Fukumoto | B29C 45/045 264/250 |
| 2001/0038163 A1 | * | 11/2001 | Matysek | B29C 45/0416 264/237 |
| 2004/0094866 A1 | * | 5/2004 | Boucherie | B29C 45/0416 264/255 |
| 2007/0278713 A1 | * | 12/2007 | Suter | B29C 45/14467 264/255 |
| 2009/0032996 A1 | * | 2/2009 | Orden | B29C 45/0416 264/271.1 |
| 2009/0136610 A1 | | 5/2009 | Boucherie | |
| 2009/0302490 A1 | * | 12/2009 | Lee | B29C 45/1618 264/132 |
| 2009/0315210 A1 | * | 12/2009 | Linares | B29C 45/0084 264/219 |
| 2013/0202728 A1 | * | 8/2013 | Maenner | B29C 45/76 425/169 |
| 2013/0209603 A1 | * | 8/2013 | Maenner | B29C 45/0416 425/547 |
| 2014/0035199 A1 | * | 2/2014 | Kotitschke | B29C 45/0416 264/328.11 |
| 2014/0175701 A1 | * | 6/2014 | Goebel | B29C 31/006 264/299 |
| 2014/0322377 A1 | * | 10/2014 | Boucherie | B29C 45/045 425/163 |
| 2014/0370142 A1 | | 12/2014 | Olaru | |
| 2015/0048550 A1 | * | 2/2015 | Kaczmarek | B29C 45/17 264/297.2 |

\* cited by examiner

INJECTION MOLDING MACHINE FOR MULTIPLE INJECTION OPERATIONS

RELATED APPLICATIONS

This application claims the benefit of priority under 35 USC Sections 119 and 120 to German (DE) application serial no. 10 2013 216 008.9 filed Aug. 13, 2013, and German (DE) application serial no. 10 2013 216 013.5 filed Aug. 8, 2013, the disclosures of which are incorporated herein by reference in their entirety as if fully set forth herein.

The disclosures of all of the following are incorporated by reference in their entirety as if fully set forth herein: US Application publication no. 2013/0095202, US Application publication no. 2013/0306686, US Application publication no. 2014/0037779, US Application publication no. 2014/0042148, US Application publication no. 2013/0216645, US Application publication no. 2013/0209603, US Application publication no. 2013/0202728, US Application publication no. 2013/0095202, US Application publication no. 2013/0034621, US Application publication no. 2010/0047379, US Application publication no. 2007/0054004, US Application publication no. 2006/0257521, US Application publication no. 2006/0099296, US Application publication no. 2006/0088619, US Application publication no. 2004/0009259 and International Application publication no. WO 2013/127524A1.

BACKGROUND

The present invention refers to an injection molding machine for manufacture of molded parts with at least a first injection unit for injecting melt into a first mold cavity and a second injection unit for injecting melt into a cavity of a second mold.

Many injection molded plastic molded parts ("parts" meaning objects formed within a mold cavity) consist of more than one material and are manufactured in several consecutively arranged injection molding operations. Particularly with small molded parts the close temporal sequence of various casting processes and low dimensional tolerances lead to high demands on the design of an injection molding machine.

SUMMARY OF THE INVENTION

In accordance with the invention there is provided an injection molding machine (100) for manufacture of molded parts from a plasticized material (17), comprising:

at least one first injection unit (40) having a chamber (41) for injecting the plasticized material and with a piston (42) for advancing a predetermined amount of the plasticized material along a first axis (A1) of the chamber (41) into a first cavity (7) of a first form tool or mold (6, 28), wherein the first form tool (6, 28) comprises at least one first tool or mold portion (6) and a second tool or mold portion (28), wherein the second tool or mold portion (28) has at least one feed channel (27) and the first cavity (7) is at least partially arranged in the first tool portion (6), at least one second injection unit (50) having a chamber (51) for injection of the plasticized material and a piston (52) for advancing a predetermined amount of the plasticized material along a second axis (A2) from the chamber (51) into a second cavity (7a, 7b) of a second form tool (6, 29), wherein the second form tool (6, 29) comprises at least one first tool portion (6) and a third tool portion (29), the third tool portion (29) having at least one feed channel (27a) and the second cavity (7a, 7b) being at least partially arranged in the first tool portion (6), wherein the second tool portion (28) is arranged on a first tool or mold plate (26) having at least one channel (26a) connecting the one feed channel (27) to the first injection unit (40) for injection of plasticized material into the first cavity (7), the third tool portion (29) being arranged at a second tool plate (25) having at least one channel (25a) connecting the one feed channel (27a) to the second injection unit (50) for injection of the plasticized material into the second cavity (7a, 7b), and, wherein the at least one first tool portion (6, 6a) is separate from the second and third tool portions (28, 29) movable along a third axis (A3), arranged substantially perpendicular to the first and second axes (A1, A2).

The second tool or mold portion is typically arranged on a first mold plate having at least one channel, by means of which the at least one the feed channel is connected with the first injection unit to introduce plasticized material into the first cavity. The third tool or mold portion is arranged on a second mold plate having at least one channel, by means of which the at least one the feed channel is connected with of the second injection unit to introduce plasticized material into the second cavity. At least one first tool or mold portion is movable separate from the second and third tool portion along a third axis which is arranged substantially perpendicular to the first and second axis.

Thus, in the proposed design, the first tool portion with the second tool portion forms a first form tool and forms with a third tool portion a second form tool. Preferably at each of the form tools a different cavity is formed. This results from the fact that preferably after each injection molding operation the first molded part stays in the cavity and delimits the cavity. On the other hand, in preferred embodiments movable mold elements, so-called slides are arranged which serve to modify the cavity. Likewise, it is also possible that at least one further portion of the cavity is arranged in at least one further tool portion.

An injection molding machine according to the invention enables transporting of a first tool portion from one to at least one further injection station, where the first tool portion with at least one further tool portion forms a form tool having a different cavity in which plasticized material is introduced from the chamber of the respective injector. It is of course possible that a plurality of injectors introduces plasticized material of the same or of different molding materials to into the cavity.

A preferred embodiment of an injection molding machine according to the invention preferably has at least one third injection unit having a chamber for a plasticized material and a piston for advancing a predetermined amount of plasticized material along a fourth axis from the chamber into a third cavity of a third mold. Said third mold has at least one first tool portion and one fourth tool or mold portion, wherein said fourth mold portion comprises at least one feed channel and the third cavity is at least partially disposed in the first tool portion, wherein said fourth mold portion is arranged on a third mold plate having at least one channel by means of which the at least one feed channel is connectable to the third injection unit for introducing plasticized material into the third cavity.

An injection molding machine according to the invention typically has at least one further injector, where the first tool portion with at least one further tool portion forms a form tool having a different cavity, in which plasticized molding material can be introduced from the chamber. Again, by means of the fourth injector the same or a different plasticized material can be introduced into the cavity as the by means of the first and second injection unit.

The injection molding machine preferably has a fourth axis which is arranged substantially parallel to or substantially perpendicular to the first axis A1 and substantially parallel to or substantially perpendicular to the second axis A2. In one embodiment, wherein the first tool portion is moved along a horizontal axis between the injectors, these respectively the pistons can be arranged horizontally and perpendicular to the axis of movement of the first tool portion or arranged vertical and perpendicular thereto.

The injection molding machine preferably has a second tool portion which is movable for opening and closing of the first form tool in the direction of the first axis A1, and/or the third tool portion is movable for opening and closing of the second form tool in the direction of the second axis A2. In this way a plurality of successive injection operations can be made using the first mold portion.

The second tool portion is preferably movable along the first axis for opening and closing of the first mold and/or the third tool portion is movable along the second axis for opening and closing of the second mold. Due to the arrangement of the clamping unit at the tool plate at which a tool portion is mounted which is not movable along the third axis between the form tools, a simplified positioning of the tool portions of a form tool is possible: the first tool or mold portion has to be positioned along the third axis, and the second or third, fourth etc. tool portion has to be positioned along the first or second axis.

Where the injection molding machine comprises a third injection unit, the fourth tool portion is preferably movable along the fourth axis which is substantially perpendicular to the third axis A3 for opening and closing the third form tool. Also this arrangement of the closing unit facilitates the positioning of the tool portions of the third mold: the first tool portion has to be positioned only along the third axis and the fourth tool portion has to be positioned along the fourth axis. The injection molding machine can thus have any number of injection units, without affecting the positioning of the tool portions.

Preferably the first tool portion is movable with a first molded part therein after a first injection operation in the first injection unit along the third axis A3 to at least one further injection operation at a further injection unit. At the cooling station the process of solidification of the melt is accelerated in the first tool portion. Preferably, the first mold portion is movable after the cooling operation there to at least one further injection operation at a further injection unit.

Preferably the second cavity of the second form tool is independent of the first cavity of the first form tool in the sense that inside of it—at least substantially—independent molded parts are manufactured. Thus, it is possible to introduce in a first injection unit plasticized molding material into the first cavity and at a further injection unit add plasticized material into the second cavity.

The second cavity of the second mold is preferably at least partially defined by a first molded portion which has been formed by the injection process in the first form tool. After a first injection operation, in which plasticized material was introduced in a first cavity that material solidifies in the first form tool and the molded part is preferably moved within the first tool portion to a second injection unit. There, the first tool portion forms with at least one further tool portion a further form tool, which forms a further cavity after closing. The molded part produced in the first injection operation limits at least a portion of said further cavity, in which melt is introduced in a further, preferably the second injection unit. Here, the first molded part is over-molded with the plasticized material of the further injection unit.

Preferably, the first tool portion with a first molded part is movable after a further second injection operation at the second injection unit to a cooling station. After a cooling operation it is movable to at least one further injection operation at a further injection unit. At the cooling station, the solidification of the plasticized material of the second injection unit is accelerated in the first tool portion. Preferably, the first tool portion is movable after the cooling process to at least one further injection operation at a further injection unit.

Preferably the injection molding machine comprises a transport device via which the first tool portion is movable between the stations. The transport device is preferably designed so that the first tool portion is at least partially movable along an axis. In a preferred embodiment the transport device form a closed loop, so that the first tool portion is movable to different stations, up to the removal of the molded part and the temperature control of the first tool portion after which it is moved to the first injection unit again.

Preferably the injection molding machine comprises at least one tool plate at which a tool portion is arranged, and which is moveable for closing of the respective form tool together with the respective injection unit in the direction of the axis A1, A2 for opening and closing of the form tool. If the tool plate at which a tool portion is arranged, is moved together with the respective injection unit, the machine nozzle of the injector unit is always connected to the feed channel of the tool portion arranged at the tool plate. If the tool plate and the machine nozzle are moved along the axis independently of one another for opening and closing the mold, the machine nozzle is disconnectable from the mold plate, thereby especially by use of cold runner systems the feed channel can be separated from the nozzle. Also in such an embodiment the maintenance of the injection molding machine is facilitated, and in particular in case of change of material or in case of a high thermal loads on the molding material plasticized material can simply be removed from the chamber of the injector by means of a distance between the machine nozzle and the mold plate.

Preferably the injection molding machine comprises at least two tool plates at which a respective tool portion is arranged, and which axes A1, A2 for opening and closing of the respective form tool are arranged in parallel. Preferably these tool plates are arranged on one common tool plate support, which is movable in the direction of the axes A1, A2. In this embodiment, two form tools can be opened and closed simultaneously and preferably by using one single locking actuator.

Preferably the injection molding machine comprises at least two injection units for introducing plasticized material into a cavity of at least two form tools, which axes A1, A2 for opening and closing are arranged in parallel. Preferably these two injection units are arranged on one common injection unit support, which is movable in the direction of the axes A1, A2. In that an injection unit is movable independently of the tool plate and also movable away from the tool plate, an easy separation of the machine nozzle from the mold plate is possible, for example for removing thermally damaged melt from the injection unit or to service the machine. When two or more injection units are arranged on one common injection unit support, they are movable together, preferably using only one single drive.

Preferably the tool plate support and the injection unit support, which both are movable along a common axis A1, A2, are movable independently of each other. In a first embodiment, one injection unit and one tool plate are movable together to open and close a form tool. In another embodiment, one injection unit and one tool plate are independently movable. Thus where at least two injection units, and/or at least two mold plates are mounted on a common injection unit support and/or tool plate support, then at a further type the injection unit support and the tool plate support are movable together or movable independently. The choice of type is particularly dependent on the clamping force required to close the form tools, on the basic structure of the injection molding machine and thus the required dimensions of the respective support plates.

Preferably the machine includes an insert that is inserted in the cavity of a form tool prior to the injection operation wherein the insert is over molded during the injection operation. Depending on the configuration of the cavity and the applied insert, it may be necessary that the injection device is arranged horizontally or vertically.

Preferably the injection molding machine comprises at least one further tool portion, which forms a different cavity with at least one of the second, third or fourth tool portions as with the first tool portion. Such an additional tool portion may be further provided to produce a different shape than the portion which is formed with the first tool portion. Preferably, the cavity formed with the respective further first tool portion has a larger volume than the cavity formed with the cavity of the actual first tool portion.

Preferably an RFID transponder is mounted to all of the first tool portions, which in particular contains data relating to the volume of the cavity or a required preheating temperature of the tool portion. An RFID reader is arranged at the injection unit for example, which reads out data necessary for the operation of the injection unit, and is used for example for controlling the injection volume of the injection unit. In an alternative embodiment, such a further tool portion comprises a cavity which is adapted to receive excess material or thermally damaged material of one or more injecting units.

An injection molding machine according to the invention typically further comprises at least one third injection unit having a chamber for injection of the plasticized material and a piston for advancing a predetermined amount of the plasticized material along a fourth axis from the chamber into a third cavity of a third mold, said third mold comprising at least one first tool portion (6) and a fourth tool portion, wherein said fourth tool portion comprises at least one feed channel and the third cavity is at least partially disposed in the first tool portion (6), wherein said fourth tool portion is arranged on a third mold plate having at least one channel connecting the at least one feed channel to the third injection unit for injection of the plasticized material into the third cavity.

The fourth axis is typically arranged substantially parallel to or substantially perpendicular the first axis (A1) and substantially parallel to or substantially perpendicular to the second axis (A2).

The second tool portion (28) can be adapted to be movable to open and close the first form tool (6, 28) along the first axis (A1) or wherein the third tool portion (29) is movable to open and close the second form tool (6, 29) along the second axis (A2).

The fourth tool portion can be movable to open and close the third form tool along the fourth axis which is arranged substantially perpendicular to the third axis (A3).

The first tool portion (6) together with a first molded part (17a) is typically movable after a first injection operation in the first injection unit (40) along the third axis (A3) to at least one further injection operation at a further injection unit (50).

The first tool portion (6) together with a first mold portion (17a) is typically movable after a first injection operation in the first injection unit (40) along the third axis (A3) to a cooling station (3) and then, after a cooling operation, is movable to at least one further injection operation at a further injection unit (50).

The second cavity (7a, 7b) of the second form tool (6, 29) is preferably independent of the first cavity (7) of the first form tool (6, 28).

The second cavity (7a, 7b) of the second form tool (6, 29) is preferably at least partially limited by a first molded part (17a) formed by the injection operation within the first form tool (6, 28).

The first tool portion (6) is typically movable to a cooling station (3, 3a) after a second injection operation at the second injection unit (50).

The injection molding machine can include a transport device (8, 9, 10, 11) that is movable between stations (1, 2, 3, 3a, 4, 5).

The at least one tool plate (26, 25) can be moveable for closing of a respective form tool (6, 28; 6, 29) together with a respective injection unit (30, 40) in the direction of the axis (A1, A2) for opening and closing of a respective form tool (6, 28; 6, 29).

Preferably at least two tool plates (25, 26) are arranged on a common tool plate support that is movable along the first and second axes (A1, A2).

At least two injection units (40, 50) can be arranged on a common injection unit support that is movable in the direction of the first and second axes (A1, A2) for injection of plasticized material into a cavity (7, 7a, 7b) of at least two form tools (6, 28; 6, 29).

The tool plate support and the injection unit support which are movable along a common axis (A1, A2) are typically movable independently of each other.

The injection molding machine can include an insert that is inserted in a cavity (7, 7a, 7b) of a form tool (6, 28; 6, 29) prior to an injection operation wherein the insert is over-molded during the injection operation.

The injection molding machine can include at least one further tool portion (6a) that forms a different cavity with at least one of the second, third or fourth tool portions (28, 29).

In another aspect of the invention there is provided a method of producing molded parts comprising injecting a plasticized material from an injection molding machine (100) to one or more cavities of one or more tools or molds where the injection molding machine is comprised of:

at least one first injection unit (40) having a chamber (41) for injecting the plasticized material and with a piston (42) for advancing a predetermined amount of the plasticized material along a first axis (A1) of the chamber (41) into a first cavity (7) of a first form tool (6, 28), wherein the first form tool (6, 28) comprises at least one first tool portion (6) and a second tool portion (28), wherein the second tool portion (28) has at least one feed channel (27) and the first cavity (7) is at least partially arranged in the first tool portion (6), at least one second injection unit (50) having a chamber (51) for injection of the plasticized material and a piston (52) for advancing a predetermined amount of the plasticized material along a second axis (A2) from the chamber (51) into a second cavity (7a, 7b) of a second form tool (6, 29), wherein the second form tool (6, 29) comprises at least one first tool portion (6) and a third tool portion (29), the third tool portion (29) having at least one feed channel (27a) and the second cavity (7a, 7b) being at least partially arranged in the first tool portion (6), wherein the second tool portion (28) is arranged on a first tool or mold plate (26) having at least one channel (26a) connecting the one feed channel (27) to the first injection unit (40) for injection of plasticized material into the first cavity (7), the third tool portion (29) being arranged at a second tool plate (25) having at least one channel (25a) connecting the one feed channel (27a) to the second injection unit (50) for injection of the plasticized material into the second cavity (7a, 7b), and, the at least one first tool portion (6, 6a) is separate from the second and third tool portions (28, 29) movable along a third axis (A3), arranged substantially perpendicular to the first and second axes (A1, A2).

Further advantages, features and application possibilities of the present invention will become apparent from the following description taken in conjunction with the figures.

DETAILED DESCRIPTION

Figure 1:
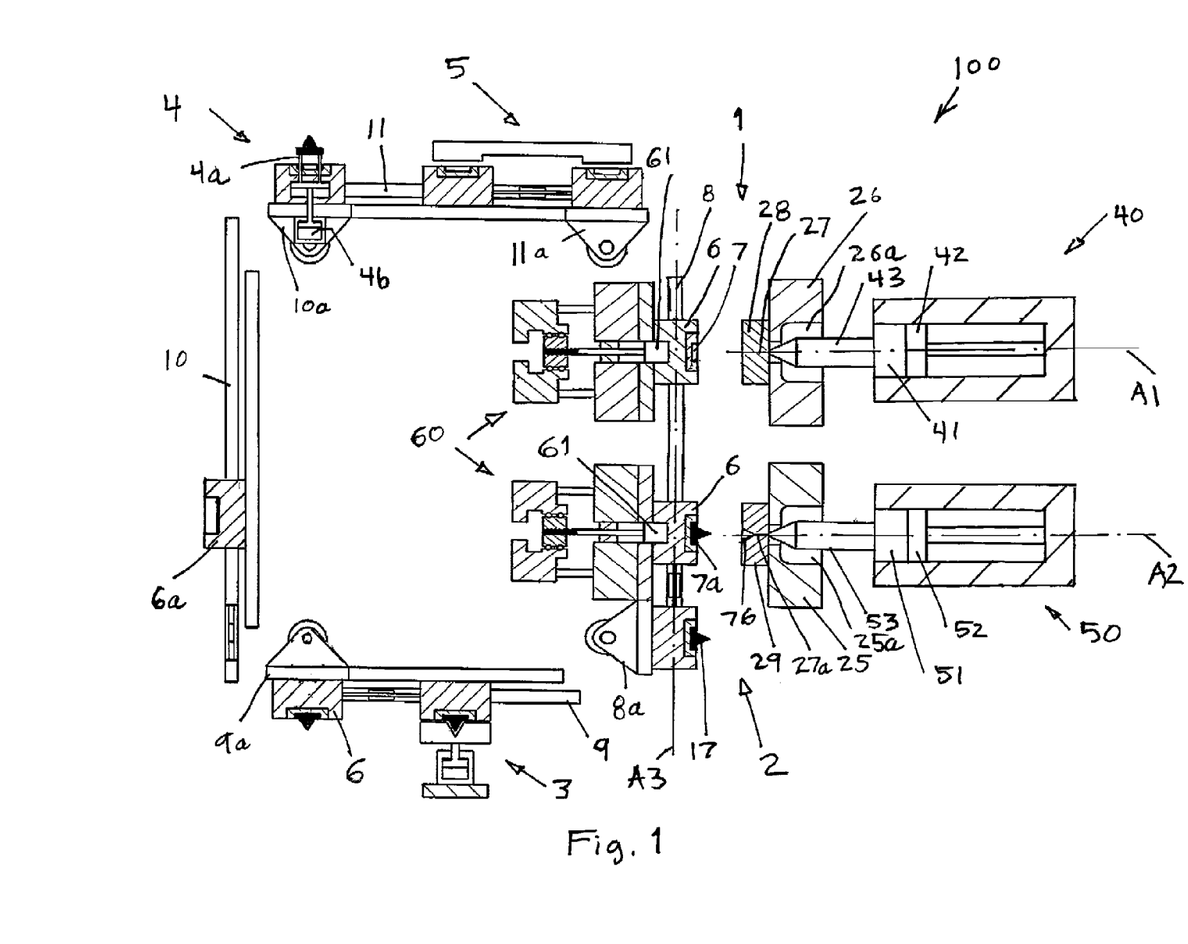
FIG. 1 is a schematic plan view of an injection molding machine according to the invention.

FIG. 1 shows an exemplary injection molding machine 100. This comprises a first injection unit 40 and a second injection unit 50. Each injection unit 40 and 50 has a respective chamber 41, 51 for plasticized material and a piston 42, 52 for feeding the plasticized material along the axes A1, A2 into the cavity of a first and a second form tool 6, 28 and 6, 29. As can be seen, a first tool portion 6 is arranged in the injection station 1, which has a cavity 7. The transport of the first tool portion 6 along the axis A3 from the first injection station 1 to the second injection station 2 is carried out by means of a transport means 8, at which the first tool portion 6 is arranged movable in the direction of the axis A3. The transport means may be a in particular pneumatic or electric system, such as a linear axis.

Vis-à-vis of the first tool portion 6, a second tool portion 28 is arranged, which is arranged on a tool plate 26. The second tool portion 28 has a feed channel 27 in which the plasticized material can be introduced by means of the injection nozzle 43 which is arranged on the injection unit 40.

In the injection station 2 of FIG. 1, a further first tool portion 6 is arranged, wherein—after a first injection operation in the first injection station 1—a (partial) cavity 7a is formed which is partly limited by the plasticized material injected at the first injection station 1. Vis-à-vis of the first tool portion 6, a third tool portion 29 is arranged, in which a (partial) cavity 7b is formed. The third tool portion 29 is arranged on a second tool plate 25. The first and second tool plate 26, 25 each have a channel 26a, 25a, through which the respective machine nozzle 43, 53, which is arranged on the injection unit 40, 50 respectively, is connectable to the second and third tool portions 28, 29. The second tool portion 28 has a feed channel 27, by means of which plasticized material is introducible into the cavity 7 and the third tool portion 29 has a feed channel 27a, by means of which plasticized material is introducible in the cavity 7a, 7b.

The second tool portion 28 is disposed on the tool plate 26 and connectable to the injection unit 40. When the first tool portion 6 is moved by the transport means 8 into the injection station 1, the first tool portion 6 is positioned therein by means of a positioning device 60 on the axis A3, in particular horizontally. For this a positioning pin 61 is inserted in a recess of the first tool portion 6 perpendicularly to the axis A3. Then the second tool portion 28, which is arranged on the first tool plate 26 is moved together with the latter along the axis A1 in the direction of the first tool portion 6, to close the form tool 6, 28 and thus to close the cavity 7 formed therein. During pressing of the machine nozzle 43 to the machine platen 26, plasticized material is fed through the feed channel 27, and fills the cavity 7 under pressure.

After opening of the form tool 6, 28 the first tool portion 6 is transported by the transportation means 8 along the axis A3 to the second injection station 2. In FIG. 1, a first tool portion 6 is shown in the injection station 2. The second form tool 6, 29 is shown in already opened position after a second injection operation so that a molded part 17 is arranged in the cavity 7a.

In the injection station 2, a second tool part 29 is disposed vis-à-vis to the first tool portion 6, which is arranged on a tool plate 25. The second tool portion 29 has a feed channel 27a, into which plasticized material is introducible by means of a machine nozzle 53. Further, a second tool portion 29 has a (partial) cavity 7b, which together with the first tool portion 6 forms a second cavity 7a, 7b when the second form tool 6, 29 is closed.

In FIG. 1, at the right side of the first transport means 8, a first pivotable transport means 8a is arranged, which is pivoted by means of a rotary drive through 90 degrees. Thus, the first pivotable transport means 8a can be brought from that position shown in FIG. 1, in which it is aligned with the first transport means 8, in a position in which it is aligned with a second transport means 9, which is arranged at an angle of approximately 90 degrees to the first transport means 8. A first tool portion 6 disposed on the first transport means 8 can thus be transported initially on the first pivotable transport means 8a, and then to the second transport means 9.

At the second transport means 9 a further station designed as a cooling station 3 is arranged. The cooling station 3 includes an air supply, by means of which an air flow is guided onto the first tool portion 6. By means of the cooling effect of the air flow the first tool portion 6 and in particular the molded part 17 located in the first tool portion 6 is cooled.

In FIG. 1 below the second transport means 9 a second pivotable transport means 9a is disposed, which is pivoted by means of a rotary drive through 90 degrees. Thus, the second pivotable transport means 9a can be brought from that position shown in FIG. 1, in which it is aligned with the second transport means 9, in a position in which it is aligned with a third transport means 10, which is arranged at an angle of approximately 90 degrees to the second transport means 9. A first tool portion 6 disposed on the second transport means 9 can thus be transported first on the second pivotable transport means 9a, and then after rotation of the second pivotable transport means 9a to the third transport means 10.

As is further shown in FIG. 1, to the left side of the third transport means 10 a fourth transport means 11 is arranged, which is disposed at an angle of about 90 degrees to the third transport means 10. At the lower end of the fourth transport means 11, a third pivotable transport means 10a is disposed, which is pivoted by means of a rotary drive through 90 degrees. Thus, the third pivotable transport means 10a can be brought from that position shown in FIG. 1, in which it is aligned with the fourth transport means 11, in a position in which it is aligned with a third transport means 10. A first tool portion 6 disposed on the third transport means 10 can thus be transported first on the third pivotable transport means 10a, and then after rotation of the third pivotable transport means 10a to the fourth transport means 11.

At the third pivotable transport device 10 a discharge station 4 is disposed, in which the molded part 17 is removed from the cavity 7a in which it is still located when the first tool portion 6 is disposed in the station 4. The removal is done by means of plungers 4a, which are operated by a pneumatic cylinder 4b.

At the fourth transport device 11a further station is located, which is designed as a heating station 5. In the heating station 5 the cavity 7 of the first tool portion 6 is heated to a desired temperature.

In FIG. 1 above the fourth transport means 11a fourth pivotable transport means 11a is disposed, which is pivoted by means of a rotary drive through 90 degrees. Thus, the fourth pivotable transport means 11a can be brought from that position shown in FIG. 1, in which it is aligned with the fourth transport means 11, in a position in which it is aligned with a first transport means 8, which is arranged at an angle of approximately 90 degrees to the fourth transport means 11. A first tool portion 6 disposed on the fourth transport means 11 can thus be transported first on the fourth pivotable transport means 11a, and then after rotation of the fourth pivotable transport means 11a to the first transport means 8.

On the first transport means 8, the first tool portion 6 is then transported back into the injection station 1. When the first tool portion 6 has reached its position in the injection station 1, it is, as mentioned above, positioned by the positioning means 60, 61 and the form tool 6, 28 is closed to perform an injection operation.

At the exemplary injection molding machine 100, a further first tool portion 6a is also arranged on the transport device 10, which in a closed position forms a cavity together with the second and third tool portion 28, 29, which is different from the respective cavity which forms the first tool portion 6 with the second and third tool portions 28, 29. The exterior geometry of the further first tool portion 6a does not differ from the geometry of the first tool portion 6, so that the first tool parts 6, 6a are moved in the same manner of the transport means 8, 8a, 9, 9a, 10, 10a, 11, 11a. In a preferred embodiment the injection molding machine 100, an RFID transponder is attached to the tool portions 6, 6a respectively. The data contained thereon refers in particular to the volume of the cavity, which is read by a RFID reader arranged at the injection stations 1, 2 and used for controlling the injection amount of the injection units 40, 50. Also, RFID readers may be arranged at further stations of the injection molding machine 100 to control the operations performed in these stations depending on the first tool portion 6, 6a positioned there.

In each case one tool portion 6, 6a is movable on a respective transport device 8, 8a, 9, 9a, 10, 10a, 11, 11a, independently from the other tool portions on the other, or on the same transport unit 8, 8a, 9, 9a, 10, 10a, 11, 11a. Each of the tool portions 6, 6a arranged on the injection molding machine 100 may be moved independently in time and distance on the transportation devices 8, 8a, 9, 9a, 10, 10a, 11, 11a. The injection molding machine 100 may also be configured such that at least two tool portions 6, 6a are movable at least simultaneously and/or the same distance, especially when these are arranged on the same transport means 8, 9, 10, 11. The transport means 8, 8a, 9, 9a, 10, 10a, 11, 11a is designed such that the respective tool portions 6, 6a of one transport means 8, 8a, 9, 9a, 10, 10a, 11, 11a are moved to the next transport means 8a, 9, 9a, 10, 10a, 11, 11a, 8. The preferred direction of movement of the tool portions 6, 6a on the transport means 8, 8a, 9, 9a, 10, 10a, 11, 11a is a clockwise direction. During the movement of a tool portion 6, 6a from one transport means 8, 9, 10, 11 to the next transport means 9, 10, 11, 8, the tool portions 6, 6a, are also pivoted clockwise by means of the pivotable transport means 8a, 9a, 10a, 11a.

Figure 2:
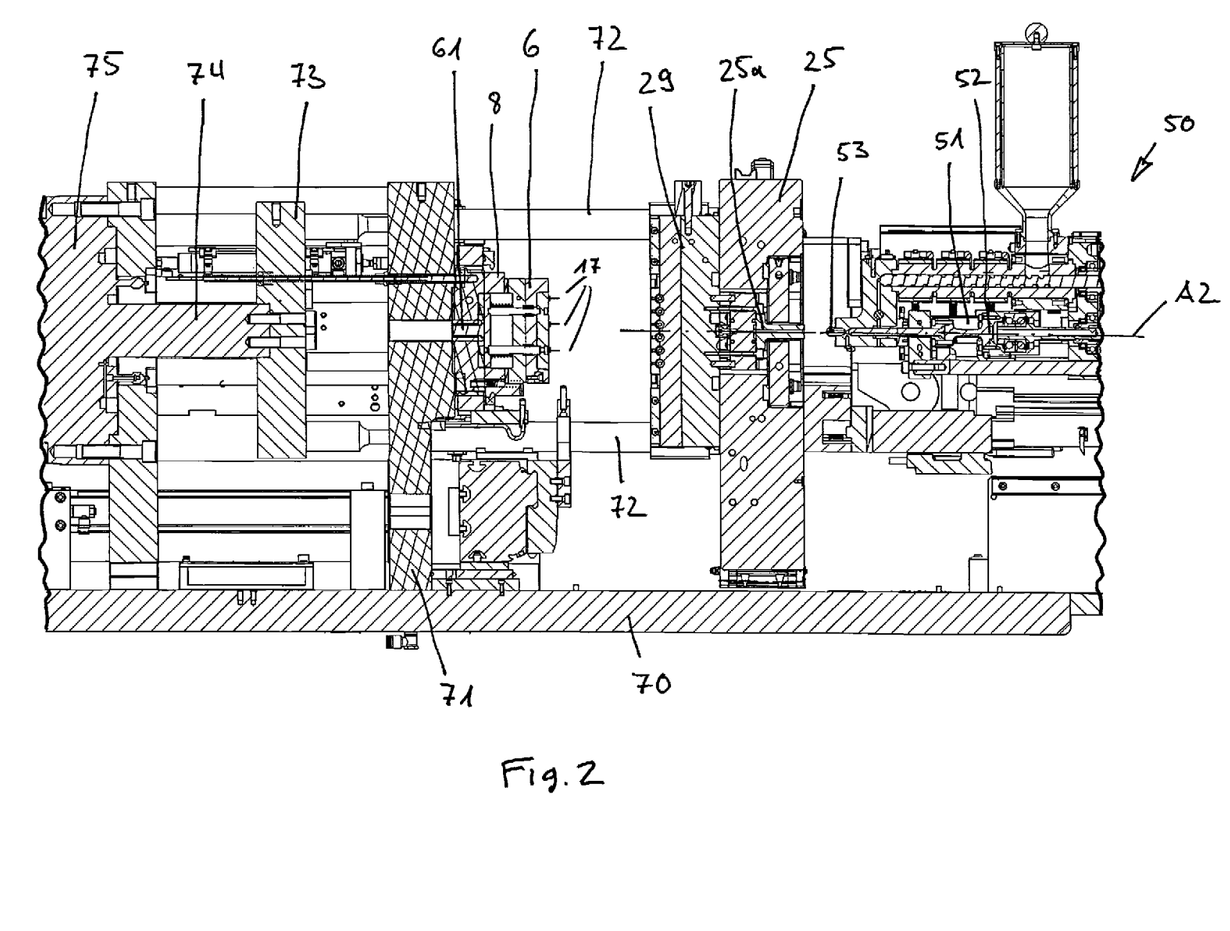
FIG. 2 is a sectional side view of the molding machine of FIG. 1.

FIG. 2 shows a sectional view of an exemplary injection molding machine 100 designed corresponding to the schematic representation in FIG. 1, which shows substantially the injection station 2. The first tool portion 6 is located in the injection station 2 after the injection molding process and after opening the of mold tool 6, 29. Three superposed molded parts 17 are visible in the first tool portion 6. The third tool portion 29 is moved together with the second tool plate 25 along the axis A2 in an open position. The second mold plate 25 includes a hot runner system comprising at least one channel 25a, by means of which a not shown feed channel of the third tool portion 29 is connectable to the second injection unit 50. The second injection unit 50 is also movable along the axis A2, so that the machine nozzle 53 can be pressed against the opening of the channel 25a. The second injection unit 50 further includes a chamber 51 and a piston 52, for introducing a predetermined volume of plasticized material which is arranged in the chamber 51 along the second axis A2 from the chamber 51 into the cavity 7a, 7b of the mold 6, 29.

The first tool portion 6 is arranged on a transport means 8 and movable perpendicular to the sectional plane along an axis A3. The transport means 8 and thus the first tool portion 6 are arranged on a table 70 which is permanent disposed on the machine tool plate 71. The tool plate 71 also serves as a support of the mold clamping rams 72, which are connected via a cross member 73 with a spindle 74 of a mold-clamping actuator 75, for moving the second tool plate 25 with the third tool portion 29 along the axis A2, and which is required for the application of the closing force necessary for an injection molding operation.

Figure 3:
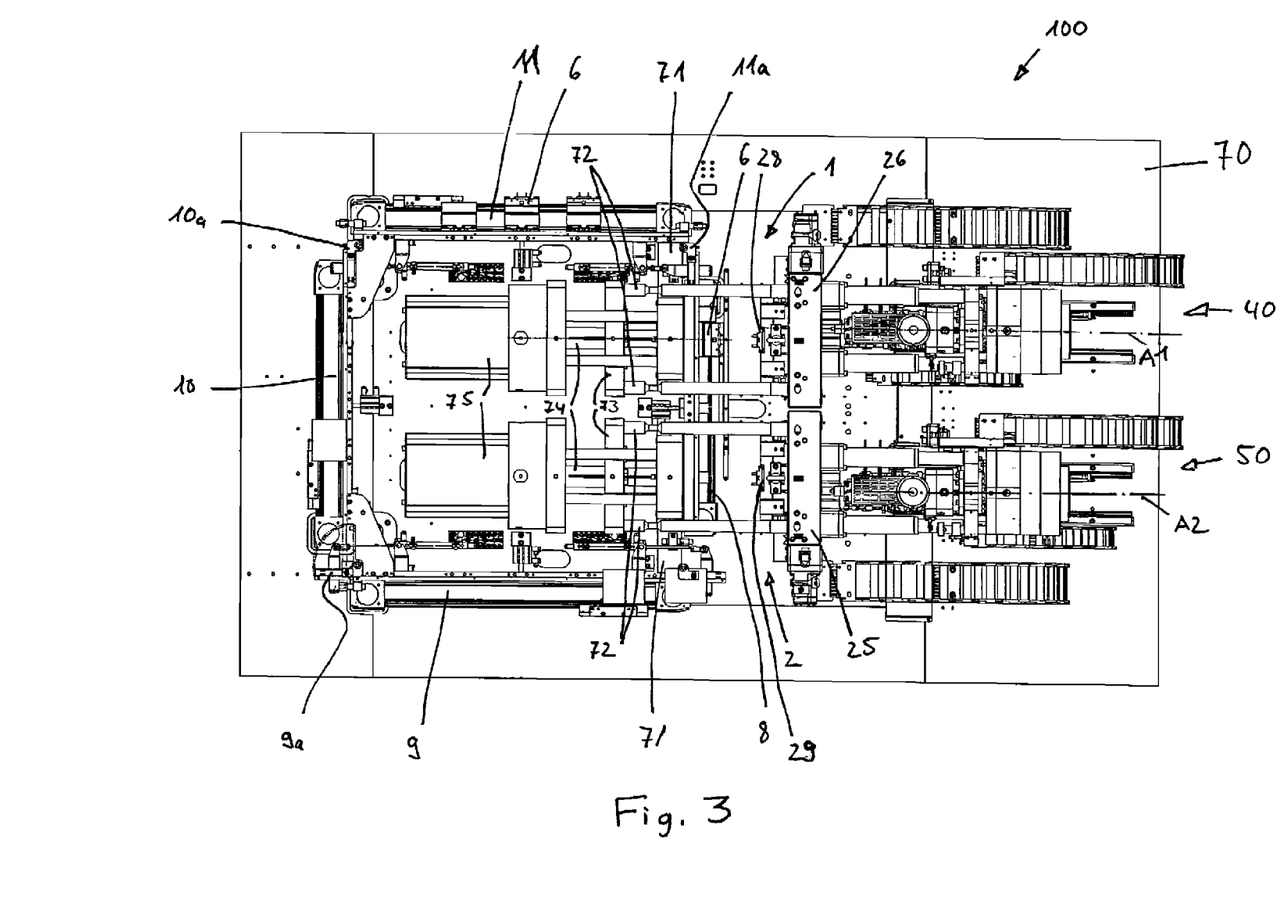
FIG. 3 is a plan view of the machine of FIGS. 1 and 2.

FIG. 3 shows a plan view of the exemplary injection molding machine 100 which is shown in FIG. 2. Identical parts are therefore denoted by the same reference numbers. In FIG. 3 it can be seen that the components of an exemplary injection molding machine 100 are arranged on a machine table 70. In the first injection station 1, a first tool portion 6 and a second tool portion 28 are arranged, wherein the form tool 6, 28 is shown in an open position after an injection operation. In this case the second tool portion 29 together with the second mold plate 26 is moved in the direction of the axis A1 in an open position. In this illustration no first tool portion 6 is arranged in the injection station 2. On the transport means 11 further first tool portions 6 are arranged. In the exemplary embodiment in FIG. 3, the transport devices 8, 9, 10 and 11 are designed as linear electric actuators.

Figure 4:
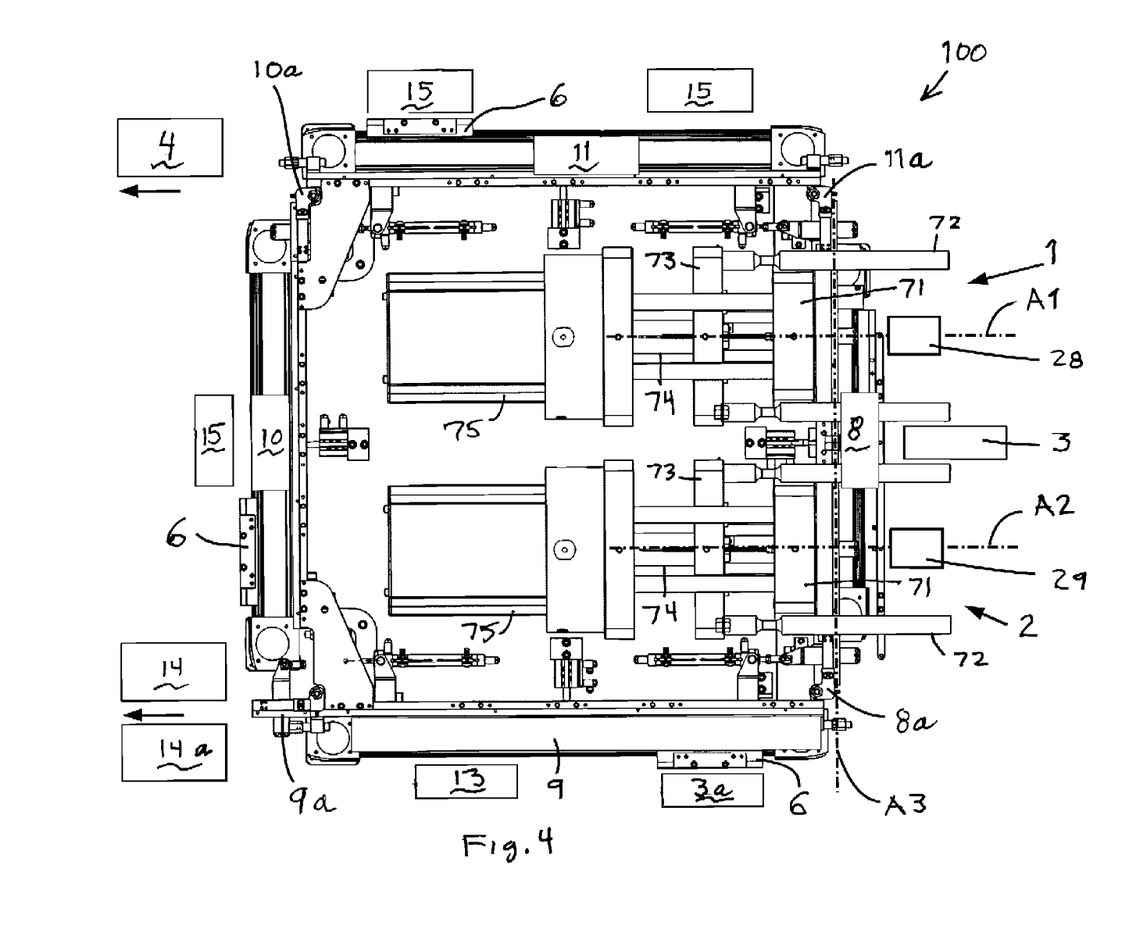
FIG. 4 is a schematic plan view of an embodiment of an injection molding machine according to the invention.

FIG. 4 shows a schematic plan view of another exemplary injection molding machine 100, the structure of which largely corresponds with the construction of the injection molding machine 100 of FIG. 1 so that like parts are again denoted by the same reference numbers. The injection molding machine 100 includes two injection stations 1 and 2 which are arranged in parallel to each other. The mold tool is opened and closed along a first axis A1 in the first injection station 1, the mold tool is opened and closed along a second axis A2 in the second injection station 2. Transport means 8, 9, 10, 11 are arranged at the injection molding machine 100, on which first tool portions 6 are transportable independently of other first tool portions 6. At the corners of the transport means pivotable transport means 8a, 9a, 10a and 11a arranged to move the first tool portions 6 from the transport means 8, 9, 10, 11 to the transport means 9, 10, 11, 8.

Between the injection stations 1 and 2, a cooling station 3 is located for cooling the at least one molded part 17 molded in the first injection station 1. At the transport means 9, a further cooling station 3a is arranged to cool the molded part molded in the second injection station 2. Further, an inspection station 13 is arranged on the transport means 9. This inspection station 13 has a camera which detects the shape of the molded parts. At the pivotable transport means 9a, a first demolding station 14 is arranged, where such molded parts are removed from the first tool portion 6, which in particular have a defect of form which has previously been recorded by the camera at the inspection station 13. Also at the pivotable transport means 9a, a second demolding station 14a is arranged where further molded parts 17 are demolded, which does not have the desired properties in a visual inspection. This can be, for example, a molded part produced in a further first tool portion 6a.

At the transport device 10 another station 15 is disposed and at the transport device 11 two more stations 15 are arranged. In the exemplary injection molding machine 100 to the further stations 15 currently no function is assigned. Thus other stations can be inserted at the position of the further stations 15 in a flexible manner, which are necessary for the production of molded articles or in particular, a station, which is used for inserting and/or removing the first tool portions 6, 6a out of or into the transport means.

At the pivotable transport means 10a the molded parts removal station 4 is disposed, at which the desired molded parts 17 are removed from the first tool portion 6. After moving the first tool portion 6 via the transport means 11 and the pivotable transport means 11a it is moved back to the transport device 8, where it is transported along the axis A3 to the first injection station 1 and to the second injection station 2.

Figure 5:
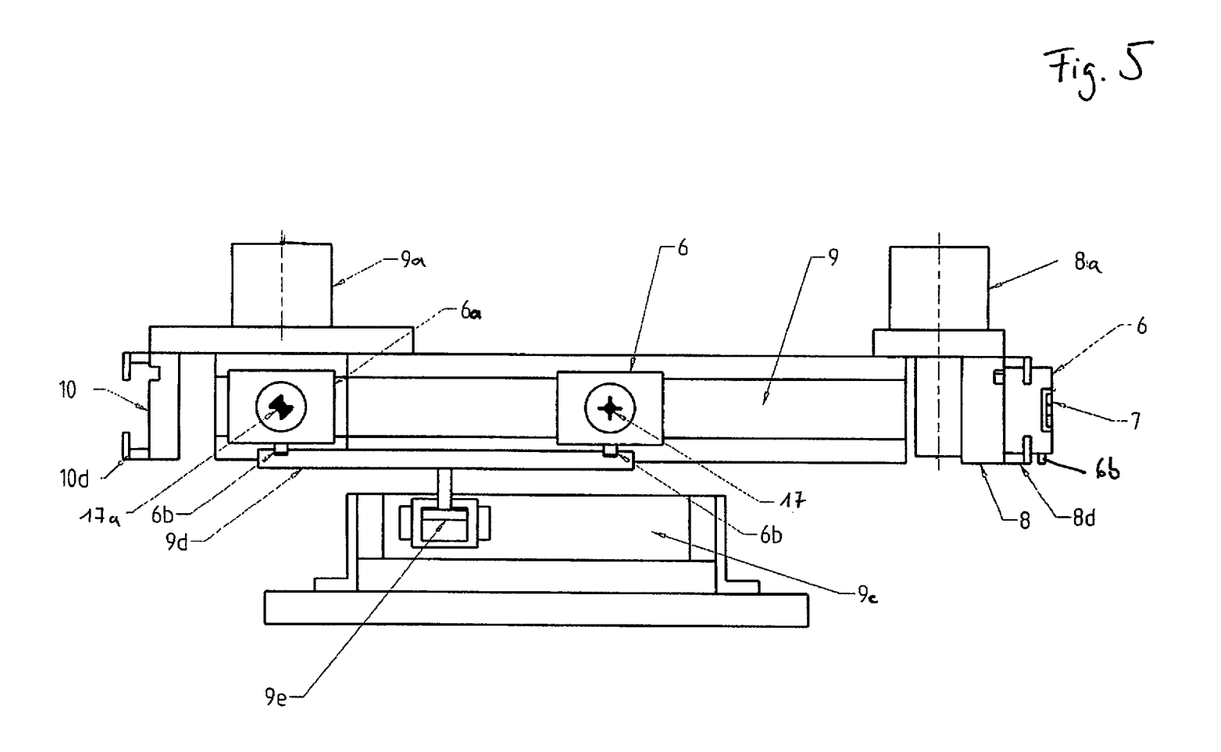
FIG. 5 is a view of an exemplary transport device component of the machine of FIG. 1.

FIG. 5 shows an exemplary transport device 8, 8a, 9, 9a, 10 of the injection molding machine 100. In the image plane the transport device 9 is shown. At the right side the transport means 8 is shown with a pivotable transportation means 8a and at the left side the transport means 10 and the pivotable transport means 9a are shown. In the transport means 8, a first tool portion 6 with a cavity 7 is shown and in the transport means 10 no tool portion is disposed. At the transport means 9 two first tool portions 6 and 6a are arranged in which molded parts 17 and 17a are disposed.

The exemplary transport device 9 comprises a linear actuator 9c, which in particular may be driven pneumatically or electrically. As can be seen from FIG. 5, a further linear actuator 9e is arranged on a driver of the linear actuator 9c. Also the linear actuator 9e may in particular be driven pneumatically or electrically. The actuator of this linear drive 9e is connected to a rail 9d. The rail 9d has recesses, into which projections 6b engage, which are arranged on the first tool portions 6, 6a. When the projections 6b engage with the recesses of the rail 9d, the first tool portions 6, 6a can be moved laterally by means of the linear drive 9c.

Figure 6:
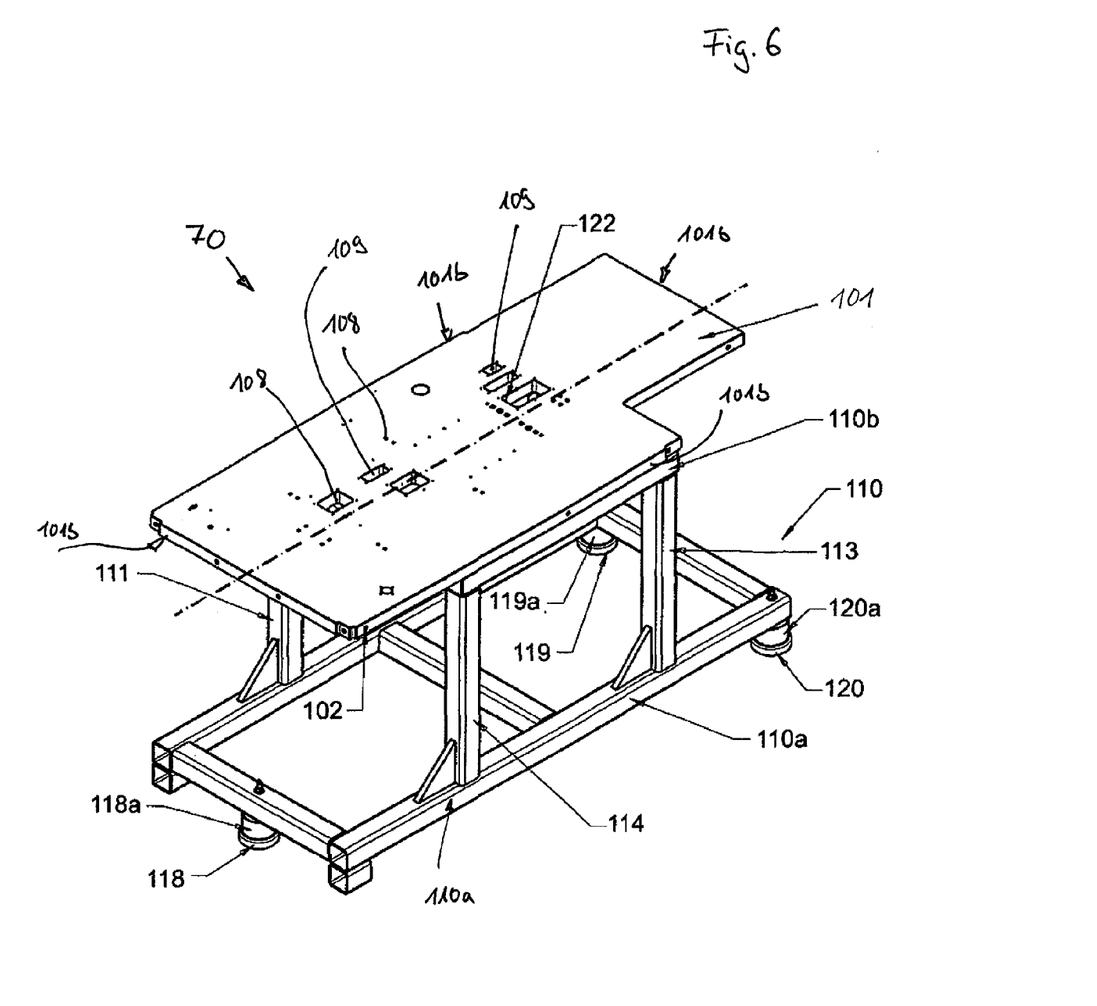
FIG. 6 is a perspective view of the machine table portion of the machine of FIG. 1.

FIG. 6 shows an example of a machine table 70 of the injection molding machine of FIG. 2. The exemplary machine table 70 comprises a base plate 101 which is schematically illustrated in FIG. 6, and on which basically the injection stations 1 and 2, the cooling station 3, the demolding station 4 and the transport means 8, 8a, 9, 9a, 10, 10a, 11, 11a are disposed. The base plate 101 has channels 102, which run parallel to the plane of the base plate 101. The channels 102 are formed as bore holes which are drilled in the end faces 101b of the base plate 101. The bore holes 102b are arranged in the middle of the plate thickness. Hereby their neutral fibers have a profile which corresponds to the neutral fiber of the base plate 101.

The base plate 101 further comprises openings 108 through which air can pass. The air passages 108 may be used for fastening of machine elements to be disposed at the base plate 101. For the arrangement of machine elements, the base plate 101 further also has openings 109. The inlets and outlets of the bore holes 102 are partially closed by means of plugs 105. Furthermore, the inlets or outlets of the bore holes 102 partially are connected to each other by means of connecting elements. The connecting elements may be conventional hoses, which have at their ends screw plugs by means of which the hoses can be screwed into the openings of the bore holes 102b. The connection of the plugs and the connectors with the bore holes 102b is arranged in a conventional manner, so that a further description can be dispensed with.

Two of the openings of the channels 102 are connected to a pump by means of which a cooling medium is pumped into the respective channels 102. The control of the pump is connected to a temperature sensor disposed in the plate 101. According to the temperature of the plate detected by the temperature sensor, the controller causes the pump to pump heat transfer medium in more or less long taking intervals into the channels 102 with its maximum performance.

As shown in FIG. 6, the base plate 101 is disposed on a base 110, which forms a machine table 70 with the base plate 101. The exemplary base frame 110 consists of a lower frame 110a and of an upper frame 110b, which are made of square tubes which are welded together. The upper frame 110b is connected to the lower frame 110a by means of supports 111, 112, 113, 114 which are also made of square tubes.

The base plate 101 rests on support members made of metal blocks, which are fixed (preferably welded) to the upper frame 110b. Screws extend through the support members by means of which the base plate 101 may be screwed to the support members. The lower frame 110a includes machine feet 118, 119, 120, which, in this exemplary embodiment, have vibration rubber elements 118a, 119a, 120a. In this way, the lower frame 110a and thus the entire machine table is vibration-cushioned.

Figure 7:
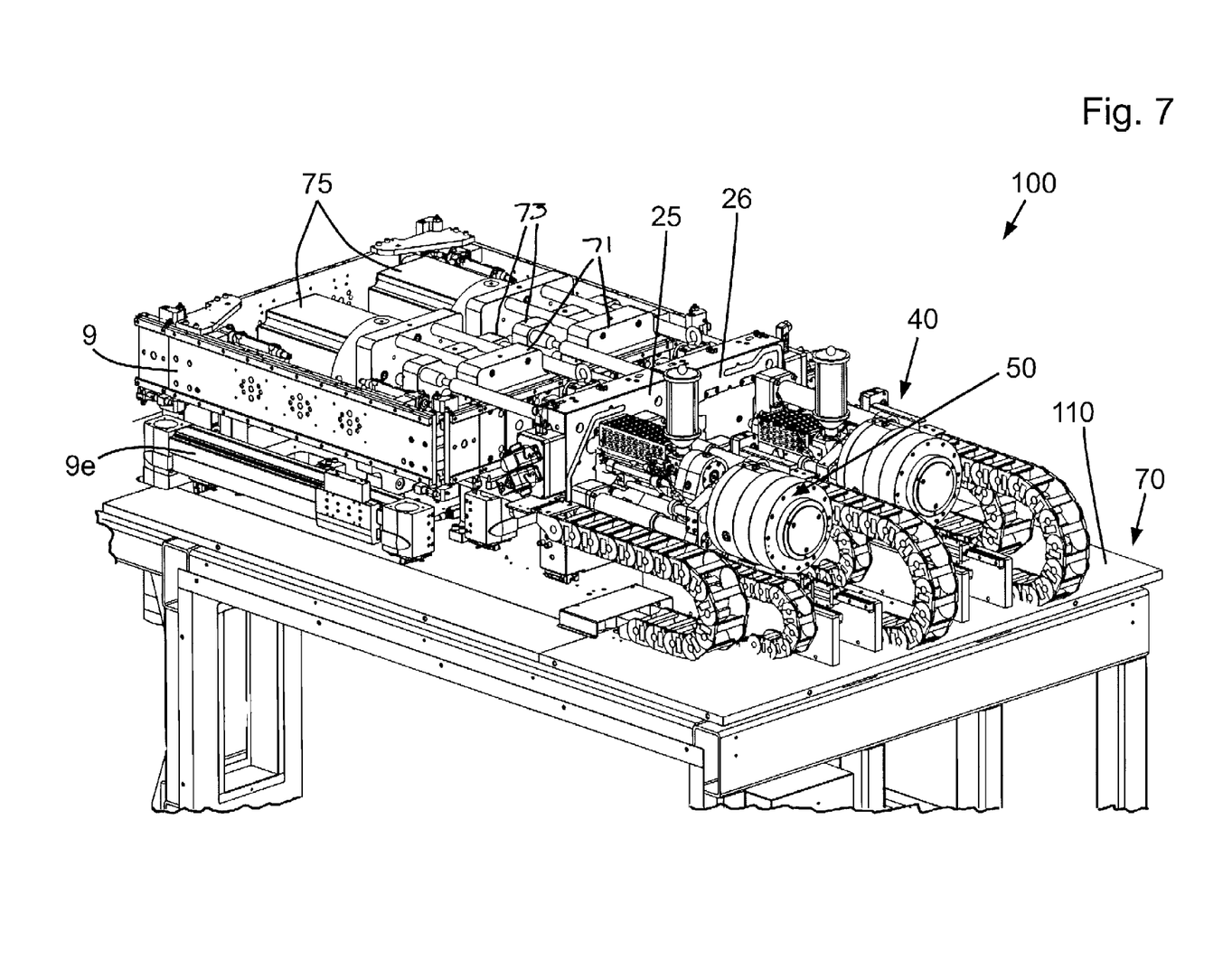
FIG. 7 is a perspective view of the machine table portion of FIG. 6 with components of an injection molding machine according to the invention arranged thereon.

FIG. 7 shows the exemplary machine table of FIG. 6 with components mounted thereon of an exemplary injection molding machine 100. The injection molding machine 100 includes two injection units 40 and 50 which are arranged at two machine platens 25, 26, and two clamping devices each having a mold clamping drive 75. Below the base plate 110 of the machine table 70 the control- and supply equipment of the injection molding machine 100 is arranged.

Figure 8:
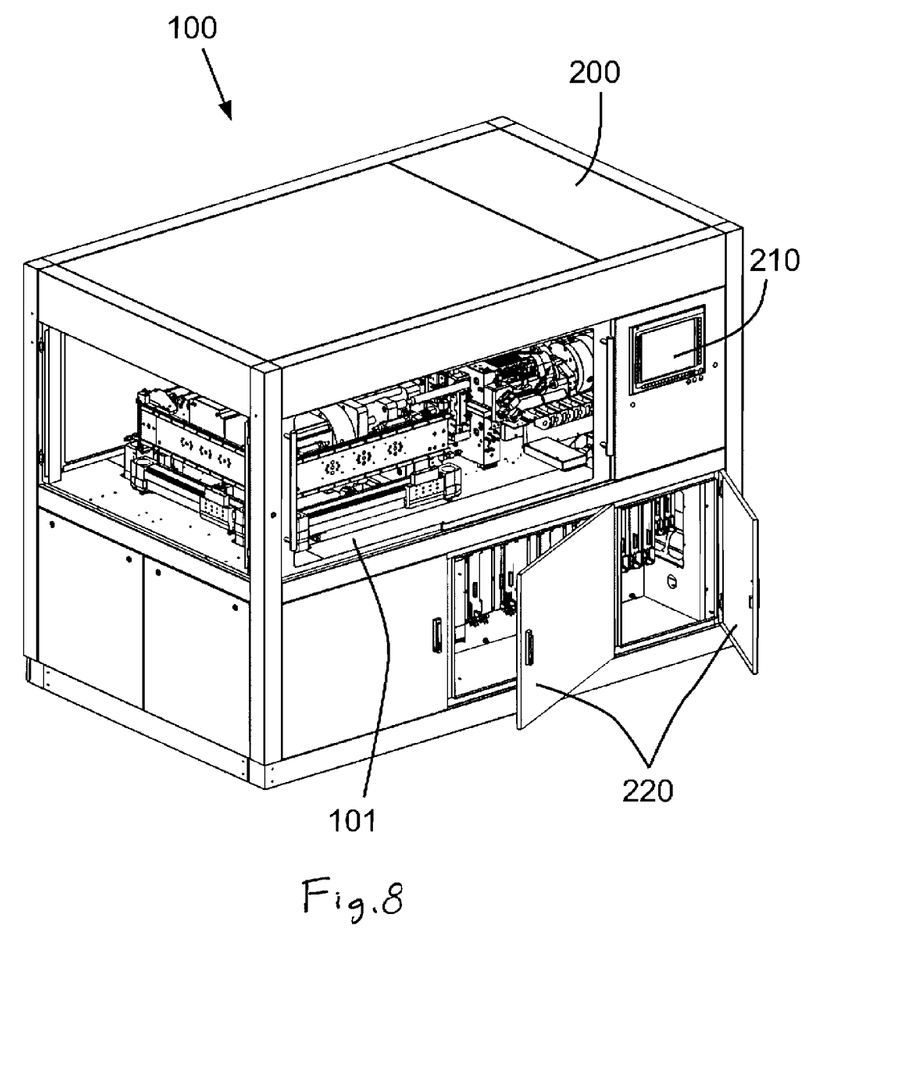
FIG. 8 is a perspective view of the injection molding machine of FIG. 7 including a machine housing.

FIG. 8 shows the exemplary injection molding machine 100 of FIG. 7 with machine cover. The base plate 101 of the machine table 70 and the components disposed thereon are arranged in an accessible area of the machine housing 200. At this accessible area at the right side in FIG. 8 a display 210 for the machine control is arranged, with which an operator can adjust and control the injection molding process. Below the accessible area of the machine housing 200 and hence below the machine table 70 a non-accessible area is arranged, in which the control and supply means of the injection molding machine 100 are disposed. This area is accessible by swivel-mounted housing doors 220 for example for maintenance purposes.

Figure 9:
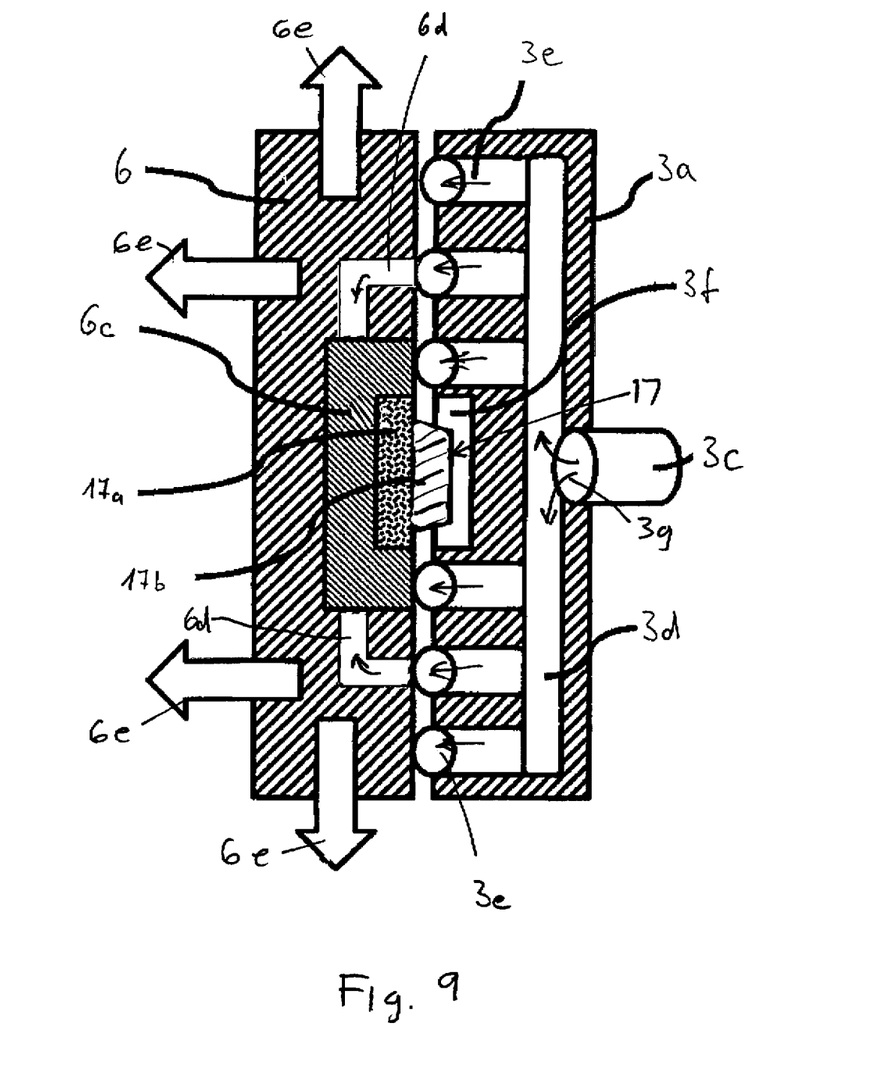
FIG. 9 a schematic cross sectional view through a portion of a tool positioned in a cooling station in a machine according to the invention.

FIG. 9 shows an exemplary cross-section through a first tool portion 6 positioned at a cooling station 3. In the cooling area the cooling station 3 comprises a cooling plate 3a with gas discharge ports 3e, from which cooling air is able to flow directly at the heat sink area of the second tool portion 6. The gas discharge ports 3e are connected by channels 3d with an inlet 3c for the cooling air. For shielding the molded part 17 from the cooling air, the cooling plate 3a has an inner cavity 3f facing to the cavity 7, into which a portion of the molded part 17 engages.

The exemplary first tool portion 6 has an insert 6c having good thermal conductivity to remove heat energy from the molded part 17. Further, the exemplary first tool portion 6 has channels 6d for the cooling air 3g, through which the cooling air is directly guided to the insert 6c. The molded part 17 located in the cavity of the first tool portion 6 consists of a first molding material 17a, which was introduced in a first injection process into the cavity 7 as well as of a second molding material 17b which was introduced into the cavity 7a, 7b in a second injection molding operation. The arrows 6e shown at the first tool portion 6 depict the heat radiation from the first tool portion 6.

Figure 10A:
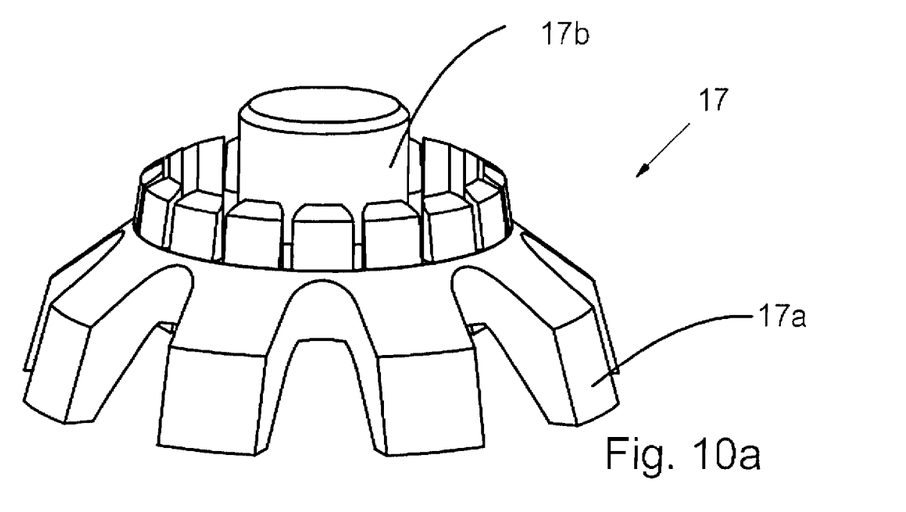
FIG. 10a is a perspective view of a molded part produced by an injection molding machine according to the invention.

FIG. 10a shows an exemplary molded part 17, which is produced with the exemplary injection machine 100. The molded part 17 has a portion 17a which is illustrated in a dark color that is formed in the cavity 7 in a first injection operation in the first injection station 1. In the second injection station 2, the cavity 7a is unblocked by pulling of a slider in the first tool portion 6 and the cavity 7b is formed in the second tool portion 29. By introducing the second plasticized material into the cavity 7a, 7b at the second injection molding station 2, the portion 17b illustrated in a bright color is formed in the second form tool 6, 29.

Figure 10B:
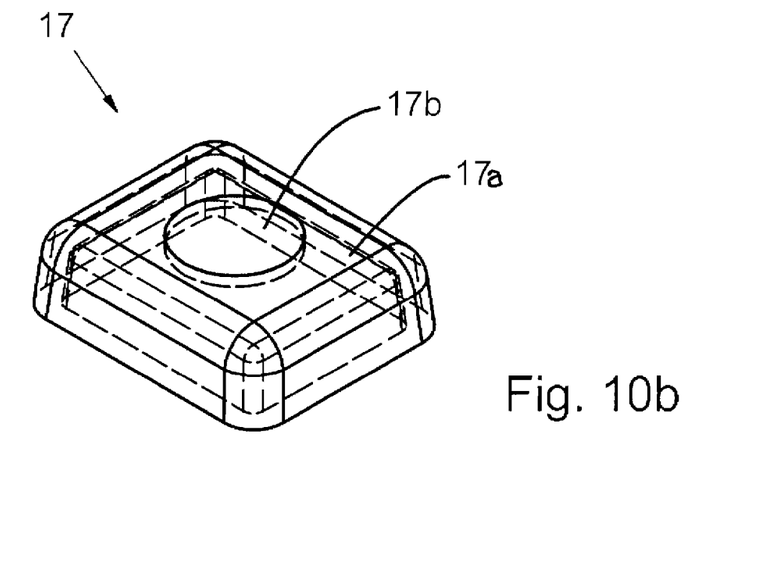
FIG. 10b is perspective view of another molded part produced by an injection molding machine according to the invention.

FIG. 10b shows another exemplary molded part 17, which is produced with the exemplary injection machine 100. The portion 17a the molded part 17 which is illustrated in a bright color is formed in a first injection operation in the injection station 1. In this case, a form element of the second tool portion 28 protrudes into the mold cavity 7 of the first tool portion 6. In the second injection station 2, the (partial) cavity 7a of the first tool portion 6 remains unchanged after the first injection operation and the second tool part 29 includes a flat surface 7b joining the outer surface of the first tool portion 6, so that the molded part 17 forms a flat surface at the lower side. By introducing the second plasticized material at the second injection molding station 2, the inner portion 17b of the molded part 17 illustrated in a dark color in FIG. 10b is formed in the second mold tool 6, 29.

What is claimed is:

1. An injection molding machine for manufacture of molded parts from a plasticized material, comprising:
at least one first injection unit having a chamber for injecting the plasticized material and with a piston for advancing a predetermined amount of the plasticized material along a first axis of the chamber into a first cavity of a first form tool, wherein the first form tool comprises at least one first tool portion and a second tool portion, wherein the second tool portion has at least one feed channel and the first cavity is at least partially arranged in the first tool portion,
at least one second injection unit having a chamber for injection of the plasticized material and a piston for advancing a predetermined amount of the plasticized material along a second axis from the chamber into a second cavity of a second form tool, wherein the second form tool comprises at least one first tool portion and a third tool portion, the third tool portion having at least one feed channel and the second cavity being at least partially arranged in the first tool portion,
wherein the second tool portion is arranged on a first tool or mold plate having at least one channel connecting the at least one feed channel to the first injection unit for injection of plasticized material into the first cavity,
wherein the third tool portion being arranged at a second tool plate having at least one channel connecting the at least one feed channel to the second injection unit for injection of the plasticized material into the second cavity,
wherein the first tool portions are separate from the second and third tool portions, and movable along a third axis arranged substantially perpendicular to the first and second axes,
wherein at least two tool plates are arranged on a common tool plate support that is movable in the direction of the first and second axes,
wherein at least two injection units for injection of plasticized material into a cavity of at least two form tools are arranged on a common injection unit support that is movable in the direction of the first and second axes, and
wherein the common tool plate support and the common injection unit support, which are movable in the direction of a common axis, are movable independently of each other.

2. The injection molding machine according to claim 1 further comprising at least one third injection unit having a chamber for injection of the plasticized material and a piston for advancing a predetermined amount of the plasticized material along a fourth axis from the chamber into a third cavity of a third mold, said third mold comprising at least one first tool portion and a fourth tool portion, wherein said fourth tool portion comprises at least one feed channel and the third cavity is at least partially disposed in at least one first tool portion, wherein said fourth tool portion is arranged on a third mold plate having at least one channel connecting the at least one feed channel to the third injection unit for injection of the plasticized material into the third cavity.

3. The injection molding machine according to claim 2 wherein the fourth axis is arranged substantially parallel to or substantially perpendicular the first axis and substantially parallel to or substantially perpendicular to the second axis.

4. The injection molding machine according to claim 1 wherein the second tool portion is adapted to be movable to open and close the first form tool along the first axis or wherein the third tool portion is movable to open and close the second form tool along the second axis.

5. The injection molding machine according to claim 3 wherein the fourth tool portion is movable to open and close the third form tool along the fourth axis which is arranged substantially perpendicular to the third axis.

6. The injection molding machine according to claim 1 wherein at least one first tool portion with a first molded part is movable after a first injection operation in the first injection unit along the third axis to at least one further injection operation at a further injection unit.

7. The injection molding machine according to claim 1 wherein at least one first tool portion with a first molded part is movable after a first injection operation in the first injection unit along the third axis to a cooling station and after a cooling operation is movable to at least one further injection operation at a further injection unit.

8. The injection molding machine according to claim 1, wherein the second cavity of the second form tool is independent of the first cavity of the first form tool.

9. The injection molding machine according to claim 1 wherein the second cavity of the second form tool is at least partially limited by a first molded part formed by the injection operation within the first form tool.

10. The injection molding machine according to claim 1 wherein at least one first tool portion is movable to a cooling station after a second injection operation at the second injection unit.

11. The injection molding machine according to claim 1 wherein a transport device is movable between stations.

12. The injection molding machine according to claim 1 wherein the at least one tool plate is movable for closing of a respective form tool together with a respective injection unit in the direction of the axis for opening and closing of a respective form tool.

13. The injection molding machine according to claim 1 wherein an insert is inserted in a cavity of a form tool prior to an injection operation and wherein the insert is overmolded during the injection operation.

14. The injection molding machine according claim 1 wherein at least one further tool portion forms a different cavity with at least one of the second, third or fourth tool portions.

\* \* \* \* \*